Feb. 13, 1962 S. KARPCHUK ETAL 3,020,766
REFERENCE SIGNAL GENERATING MEANS FOR
DYNAMIC BALANCING MACHINES
Filed April 4, 1955 2 Sheets-Sheet 1
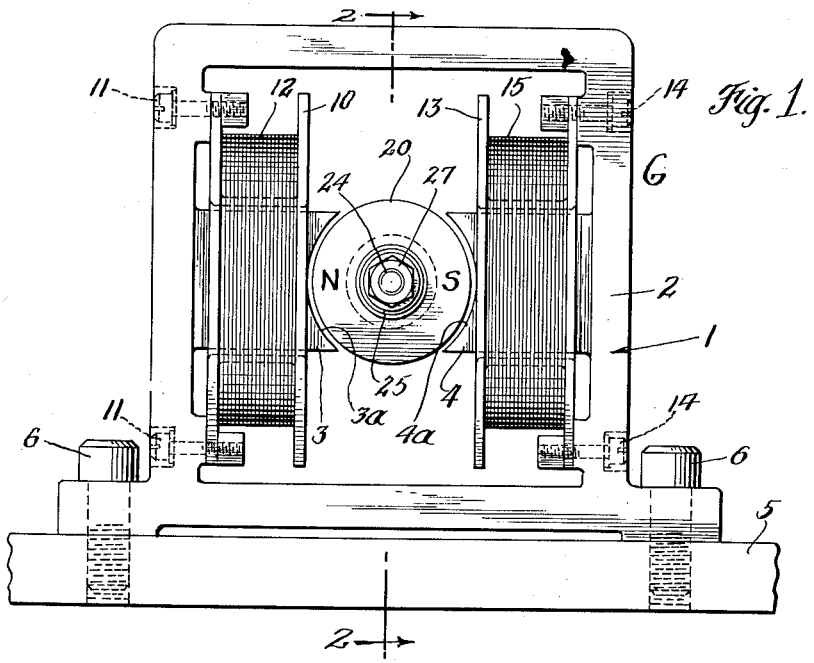
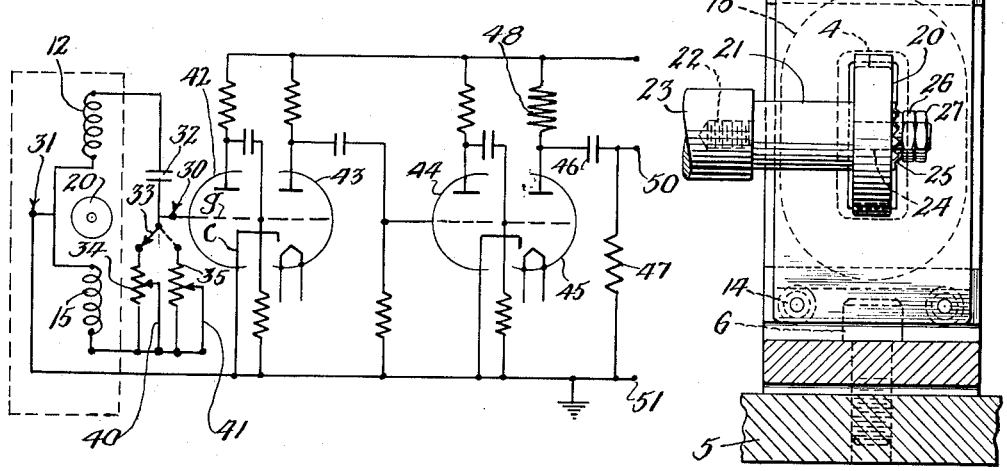
Inventors
Sylvester Karpchuk
Warren M. Gruber
By Synnestvedt & Lechner
Attorneys INVENTOR
Sylvester Karpchuk
Warren M. Gruber
BY
Synnestvedt & Lechner
ATTORNEYS

United States Patent Office 3,020,766
Patented Feb. 13, 1962

3,020,766
REFERENCE SIGNAL GENERATING MEANS FOR DYNAMIC BALANCING MACHINES
Sylvester Karpchuk, Philadelphia, and Warren M. Gruber, Horsham, Pa., assignors to Tinius Olsen Testing Machine Company, Willow Grove, Pa., a corporation of Pennsylvania
Filed Apr. 4, 1955, Ser. No. 498,979
1 Claim. (Cl. 73—462)

This invention relates to dynamic balancing equipment and, in particular, relates to means for generating a reference signal useable in the determination of the location or angle of unbalance in a test piece.

Dynamic balancing machines ordinarily include a cradle which has means for rotatably supporting a test piece and which is mounted so that rotation of the test piece causes vibration of the cradle. Dynamic balancing requires measurement in two correction planes and for this purpose, the cradle may be arranged so that vibration takes place in one plane at a time or may be arranged for simultaneous vibration in both planes.

For such different types of machines, the unbalance measuring system may take a variety of forms. However, most electrical systems determine angle of unbalance by comparing the phase relationship between a signal which is proportional to the unbalance forces and a reference signal which is related to some known position on the test piece. In a common arrangement for developing these signals, each plane has an unbalance signal pick-up associated with the cradle and a reference signal generator associated with the test piece drive means.

In calibrating a measuring system, a "master" test piece, i.e., one whose angle and magnitude of unbalance in each plane is known, is run through to check whether the angle indicator, say, a meter, reads correctly for each plane. If the indicated angle in one plane does not correspond to the known angle of the master, correction may be applied by shifting the phase of the reference signal. This is done by adjustment of the reference generator for that plane. Then the angle for the other correction plane is measured and if the indicated value is not correct, the reference generator for that plane is appropriately adjusted.

One undesirable factor associated with the foregoing is that the adjustment of a reference signal generator is ordinarily accomplished by cut and try methods and, therefore, is time-consuming and wasteful of labor. This, of course, is accentuated when two generators are used.

For reasons pointed out above and for economic reasons, it would be highly desirable in such systems if a single generator were to be used for both correction planes. However, this has not always been desirable. Theoretically, when a generator is adjusted for one correction plane, the angle measuring system should then not only indicate the correct angle for that plane but also the correct angle for the other plane. However, due to various factors such as cradle mounting, a phase shift may occur as between the pick-up signals. Hence, the measuring system would read correctly for one plane but not for the other.

The principal object of the present invention is to provide a reference signal generating system having a unique means of reference signal phase adjustment so that a single generator can be used for both correction planes and wherein the previous cut and try methods of reference signal phase adjustment are eliminated.

How the foregoing is accomplished, together with other objects, will be apparent from the following description and drawings wherein:

FIGURE 1 is an elevational view of a signal generator constructed in accordance with the invention;

FIGURE 2 is a view taken along the line 2—2 of FIGURE 1;

FIGURE 3 is a circuit diagram of certain mechanism of the invention; and

Figure 4:
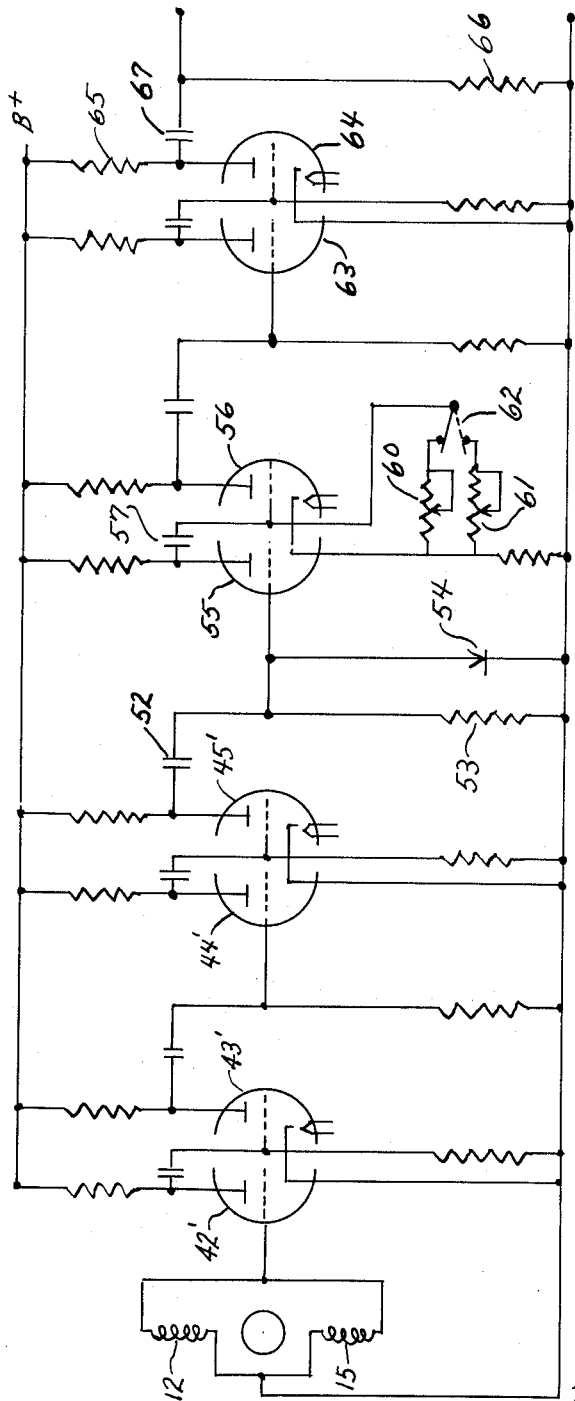
FIGURE 4 is a circuit diagram showing in particular a reference signal phase adjusting means.

In FIGURE 1 a signal generator G includes a core 1 which has a generally rectangular-shaped member 2 provided with two inwardly projecting extensions 3 and 4. The inner ends of the extensions are arcuately shaped, as indicated at 3a and 4a and, as seen in FIGURE 2, the extensions are generally rectangular in cross section. The core 1 is secured to a mounting bracket 5 as by the screws 6—6. The core is made of magnetic material and preferably is rough cast as a unitary piece and then appropriately finished machined.

Over the extension 3 is a spool 10 secured to the member 2 as by nut and bolt arrangements 11—11. Spool 10 carries a winding or a coil 12. Over the extension 4 is a spool 13 secured to the member 2 as by the nut and bolt arrangements 14—14. The spool 13 carries a coil 15. While it is not shown in FIGURE 1, the coils 12 and 15 are electrically interconnected to be in series adding.

Between the ends of extensions 3 and 4 is disposed a disk-like permanent magnet 20 having opposite poles respectively designated as N and S. As best seen in FIGURE 2, the magnet is mounted on a shaft 21 threaded at 22 into the coupling 23, which is adapted to connect the shaft and magnet to the test specimen drive means on a balancing machine (not shown) so that the magnet is rotated at the same speed as the test specimen whose unbalance is being determined.

The shaft 21 is made of brass or some other non-magnetic material so as to isolate the magnet from the coupling, which usually is made of steel. The magnet is held on a portion 24 of the shaft 21 by the bronze friction washer 25 and brass lock nuts 26 and 27. The foregoing mounting arrangement provides for the magnet to be held so as to rotate with the shaft, but capable of being angularly adjusted with respect thereto.

It will be apparent that as the magnet rotates, an alternating voltage will be generated by coils 12 and 15. The particular wave form can be desirably arranged by the amount by which the arcuate ends 3a and 4a envelop the magnet 20. Preferably the voltage is sinusoidal.

It will also be apparent that some point on the shaft 21 or the coupling 23 can be fixedly related to some known point on a test specimen to be balanced. Since the magnet is angularly adjustable on the shaft 21, the poles of the magnet can be positioned with respect to some point on the test specimen. Thus, as the test specimen and magnet rotate, the signal generated will bear some phase relationship with the known point. For example, the positively going crossover point on the signal will occur at the instant some known point on the test specimen is in some preselected angular position.

While the above-mentioned phase relationship can be shifted by angular adjustment of the magnet, such a method is not altogether desirable, and the invention proposes to obtain phase shifting by a system as explained following.

As seen in FIGURE 3, two parallel circuits are connected between the terminals 30 and 31. One circuit comprises the capacitor 32 and the coil 12 of the generator G and the other circuit comprises the switch 33, one of the potentiometers 34 or 35 (depending upon the position of switch 33) and the coil 15 of the generator. As the magnet rotates, the voltage developed by coils 12 and 15 causes current flow in the circuit described and a certain voltage appears between the terminals 30 and 31. The circuit comprising the capacitor 32, switch 33 and potentiometers 34 and 35 is a phase changing network which is shunted across the coils 12 and 15 to receive a signal therefrom. Thus, the phase of the voltage across terminals 30 and 31 may be shifted with respect to the voltage across the coils 12 and 15 by manipulation of the movable arm 40 or 41 of the potentiometers 34 or 35. The manner of tapping off a voltage (across terminals 30 and 31) whose phase angle is different than that across the coils is preferred because large phase changes can be obtained with little or no change in amplitude.

When a generator as shown in FIGURE 1 is operating and the switch 33 is in the position shown by the full lines, the voltage across terminals 30 and 31 may be shifted by manipulating the arm 40. If the switch 33 is moved to the position shown by the dotted lines, the phase of the voltage across the terminals again may be shifted as by movement of the arm 41 of the potentiometer 35.

The voltage appearing across the terminals 30 and 31 may, depending upon the particular type of measuring system, be subsequently converted into different form, be amplified, or, if of sufficient amplitude, be used without amplification. In any event, when the generator is coupled with the test specimen drive system of the balancing machine, the coupling 23 or the magnet 20, preferably the latter, is adjusted with respect to the coils so that some preselected point of the voltage wave form to be developed (considered without phase shifting) will lie reasonably close to the known reference point.

A test is run for one correction plane while one of the potentiometers is adjusted, say, potentiometer 34, so that the indicated angle is the same as the known angle. Then the switch 33 is shifted to the position shown by the dotted lines, and a test run is made for the other correction plane and the potentiometer 35 is adjusted until the indicated angle corresponds to the known angle of the master for that plane.

When production tests are being run on pieces whose unbalance is to be determined, the switch 33 is, of course, shifted as between tests in the respective correction planes. For example, the position of the switch shown in full lines may be for the left correction plane, while the position shown by the dotted lines may be for the right correction plane.

From the foregoing, it will be apparent that we have provided a reference signal generating means which overcomes the disadvantages inherent in prior schemes. Now, only a single generator is required even though unbalance is determined in two correction planes. This, of course, is of special advantage from the standpoint of equipment savings. Furthermore, the cut and try methods of phasing adjustment are eliminated. This has resulted in very considerable savings in time and labor. For example, in a balancing machine having two reference generators, the time required for two men to properly phase adjust two generators may be 5 to 10 minutes. With the present arrangement, the time required for one man is about 15 seconds.

The time saving is important not only as factory calibration is concerned but is a considerable factor from the standpoint of everyday use of a balancing machine. For example, in the balancing of crankshafts and of rotors for electric motors, very high production schedules are maintained. Often times, temperature changes may effect expansion or contraction of certain of the metal parts of the balancing machine and this may cause phase shift as between the unbalance signals developed by the pick-ups. This, of course, can be corrected by reference signal adjustment. Now, if a balancing machine were to be stopped for, say, 10 minutes to make such an adjustment, considerable production time would be lost. The present invention eliminates such prolonged stoppage because of the rapidity with which adjustment can be made.

A typical measuring system with which the present invention can be used is shown in copending application of John Reed Stovall, Jr., and Irving Weintraub, Serial No. 233,294, filed June 25, 1951, and entitled, Apparatus for Determining Dynamic Unbalance, and assigned to the assignee of the present invention, said application being issued as Patent No. 2,783,648.

In that application, the reference signal is preferably in the form of a train of negative pulses. For adapting the present invention to such a system, we have shown a network for converting the alternating signal across terminals 30 and 31 to a train of negative pulses.

As seen in FIGURE 3, these terminals are connected to the grid $g$ and the cathode $c$ of a tube 42. The tubes 42, 43, 44 and 45 are arranged to amplify and clip the positive and negative peaks of the alternating signal to form a square wave. Across the output of tube 45 is a differentiating network comprising capacitor 46 and resistor 47. The negative half of the square wave cuts off the tube 45, which permits the capacitor 46 to charge to plate supply potential through the resistor 48. The value of the resistor 48 is so that the magnitude of the charging current is relatively small. On the positive half of the square wave the tube 45 conducts heavily and in effect short-circuits the capacitor 46 and resistor 47. The capacitor then discharges through the resistor 47. The value of resistors 47 and 48 is chosen so that the ratio of discharge to charge is very large. Thus, the negative pulses across the resistor 47 are larger than the positive pulses. The negative pulses then can be fed to the measuring circuit from the terminals 50 and 51.

Another manner of reference signal phase adjustment is explained in connection with FIGURE 4.

The signal generator coils 12 and 15 are connected to the input of a circuit including the tubes 42', 43', 44' and 45' and the sinusoidal signal from the reference generator is formed into a square wave by this circuit. The square wave is fed to the differentiator comprising the capacitor 52 and the resistor 53 which converts the square wave into a plurality of positive and negative pulses occurring at the 0°, 180°, 360° crossover points of the original signal from the generator. The negative pulses are removed by the half wave rectifier 54 and the remaining pulses (positive) occur in time at the 0° and 360° positively going crossover points of the original signal. The positive pulses are fed to a one-shot multi-vibrator including the tubes 55 and 56.

The multi-vibrator has one condition in which the tube 55 is non-conducting while the tube 56 is conducting and another condition wherein the tube 55 is conducting and the tube 56 is non-conducting. The latter condition occurs at the time the positive pulse appears on the grid of the tube 55. At this time, the capacitor 57 charges, hence causing the grid of tube 56 to be biased so that the tube 56 is non-conducting. When the positive pulse is off the grid of tube 55, the capacitor 57 discharges through one or the other of the potentiometers 60 or 61. Either potentiometer can be connected in the circuit by the switch 62. The discharge of the capacitor biases the grid of tube 56 so that it conducts (the output being a pulse). The length of time for the discharge of the capacitor 57 can be controlled by desirably adjusting the connected potentiometer. Therefore, the duration of the multi-vibrator output pulse is controllable.

The output pulse from tube 56 is fed to the amplifier including the tubes 63 and 64 and the amplifier output is fed to a differentiator including the resistors 65 and 66 and the capacitor 67. The ratio of resistors 65 and 66 is chosen so that the positive pulses are very small in comparison to the negative pulses. Therefore, in effect, a train of negative pulses is formed across the resistor 66. These pulses may be fed to an unbalance measuring system such as disclosed in copending application of John Reed Stovall, Jr. and Irving Weintraub, Serial No. 233,294, now Patent No. 2,783,648.

The manner in which the foregoing arrangement operates will be apparent from the following. The generator is set up so that its signal bears a known phase relationship with a known rotational position of the test piece; for example, the positively going crossover point on the signal may be related to the known rotational position. The leading edge of the controlled output pulse from the multi-vibrator corresponds to the positively going crossover point of the original signal. Since the duration of the controlled output pulse is controlled by the connected potentiometer 60 or 61, the position of the trailing edge of the pulse is settable with respect to the leading edge. When the output pulse from the multi-vibrator is differentiated by the differentiator comprising resistors 65 and 66 and capacitor 67, the remaining negative pulse is formed on the time axis at a point corresponding to the trailing edge of the multi-vibrator output pulse. Therefore, by adjusting the connected potentiometer 60 or 61, the position of the negative pulse is shiftable or settable with respect to the original signal or more particularly, with respect to the positively going crossover point.

In practice, the potentiometer 60 may be used for the left correction plane and the potentiometer 61 for the right correction plane and when adjustments are to be made, the switch 62 is appropriately set to connect the proper potentiometer into the circuit.

We claim:

For unbalance determining equipment having means to rotate a test piece and means for measuring the angle of unbalance in each of two planes of correction for the test piece by comparing the phase relationship between a signal proportional to unbalance forces and a reference signal, reference signal generating means usable for both planes including: a signal generator connected with said test piece rotating means and having two coils connected in series adding for developing an alternating signal related in time to a known rotational position of the test piece; a phase shifting network connected in series with said coils including a capacitor, two potentiometers and a switch for alternatively interconnecting one of the potentiometers and said capacitor; and two reference signal terminals, one being connected between said coils and the other between the switch and capacitor.

References Cited in the file of this patent
UNITED STATES PATENTS

| | | |
|---|---|---|
| 1,275,292 | Neuland | Aug. 13, 1918 |
| 1,561,452 | Alden | Nov. 17, 1925 |
| 2,451,863 | Oakley | Oct. 19, 1948 |
| 2,484,197 | Veldhuis | Oct. 11, 1949 |
| 2,486,656 | Klinkhamer | Nov. 1, 1949 |
| 2,521,141 | Allen | Sept. 5, 1950 |
| 2,678,558 | Pischel | May 18, 1954 |
| 2,704,452 | Federn | Mar. 22, 1955 |
| 2,731,835 | Hellar et al. | Jan. 24, 1956 |

FOREIGN PATENTS

| | | |
|---|---|---|
| 632,652 | Great Britain | Nov. 28, 1949 |
| 686,272 | Great Britain | Jan. 21, 1953 |